Jan. 15, 1952     A. C. RUGE     2,582,886
DIFFERENTIAL LOAD WEIGHING DEVICE
Filed March 13, 1948     2 SHEETS—SHEET 1

INVENTOR
ARTHUR C. RUGE
BY
ATTORNEY

Jan. 15, 1952 A. C. RUGE 2,582,886
DIFFERENTIAL LOAD WEIGHING DEVICE
Filed March 13, 1948 2 SHEETS—SHEET 2
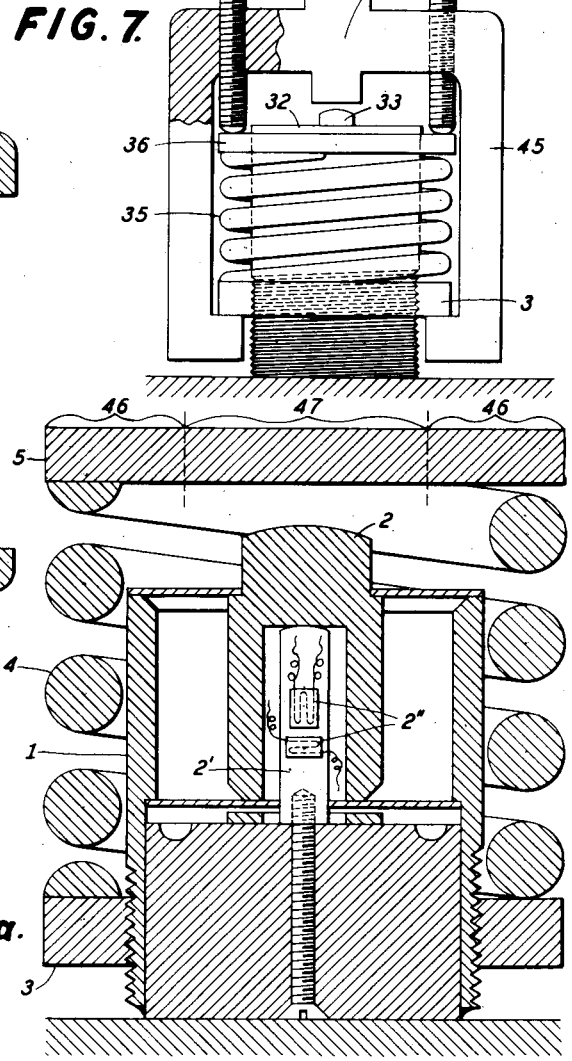
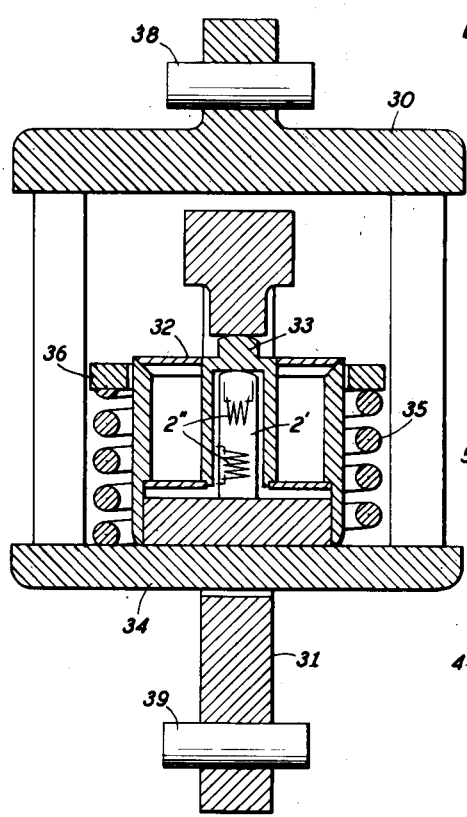
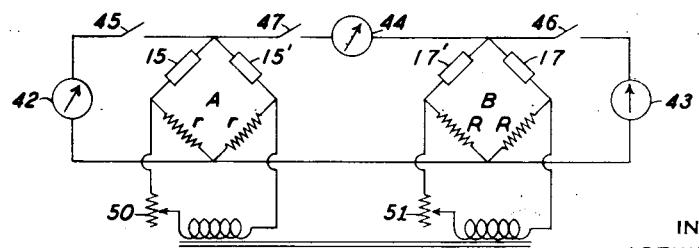
INVENTOR
ARTHUR C. RUGE
BY
ATTORNEY Patented Jan. 15, 1952

2,582,886

UNITED STATES PATENT OFFICE 2,582,886

DIFFERENTIAL LOAD WEIGHING DEVICE

Arthur C. Ruge, Cambridge, Mass., assignor to Baldwin-Lima-Hamilton Corporation, a corporation of Pennsylvania Application March 13, 1948, Serial No. 14,677

7 Claims. (Cl. 73—141)

This invention relates generally to differential load-weighing devices whereby only a desired portion of a total load is to be weighed, although the principles employed herein make it possible to weigh also the total load if desired.

In a well-known form of load-weighing device usually referred to as a "load cell," a strain-sensitive element is arranged to receive, by direct application, an entire load and electrical impedance means are connected to said element so as to be controlled by strains induced therein by such entire load. This requires the capacity of the strain-sensitive element to be rated for the full load and that differential weighing must therefore depend upon measurements involving only a fraction of the capacity of the strain sensitive element.

It is an object of my invention to provide an improved combination of elements for measuring the desired portion of a total load without it being necessary to know or otherwise determine the magnitude of that part of the load which it is desired to eliminate from the measurement, and at the same time to utilize substantially the full capacity of the load-sensing element for weighing the desired part of the load.

In accomplishing the foregoing object I am able to utilize a strain-sensitive element having a higher degree of strain response for a given increment of load than would be the case if the element were made for a greater load capacity. Consequently my improved device can easily and readily obtain a higher degree of accuracy and sensitivity than would otherwise be possible if a larger capacity strain-sensitive element had to be used to carry the full load. I thus achieve a high degree of accuracy by virtue of the practically complete freedom of my device from friction, as well as utilizing the full capacity of the load-sensing element for measuring only the desired part of the total load.

A still further object is to make it possible with the same device to measure separately or simultaneously the total load, the desired portion thereof, and the difference between the two.

Other objects and advantages will be more apparent to those skilled in the art from the following description of the accompanying drawings in which:

Fig. 1a is a section on line 1a—1a of Fig. 1;

Fig. 6 is a vertical section taken substantially on line 6—6 of Fig. 5;

Fig. 7 is a further modification shown in elevation for compression loads; and

Fig. 8 is a wiring diagram for combining the gages of any given device to obtain a desired type of load reading.

Figure 1:
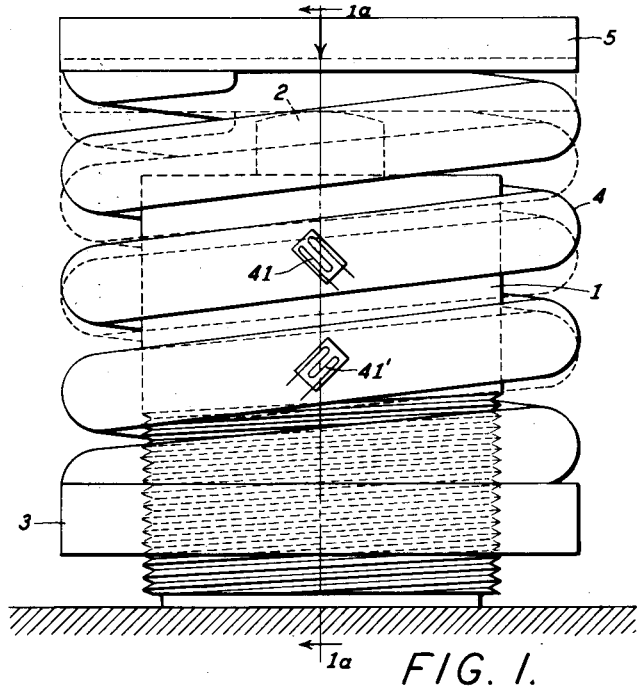
Fig. 1 is an elevational view of my improved differential load weighing apparatus adapted for compression loads.

In the particular embodiments of the invention which are disclosed herein merely for the purpose of illustrating several specific forms among possible others that the invention might take in practice, I employ as shown in Fig. 1 a load cell which may, although not necessarily, be any one of the types shown and described in my copending application for United States patent filed March 14, 1946, Serial No. 654,246, now Patent No. 2,472,047, issued May 31, 1949. Within a shell 1 of such a load cell a loading button 2 is integrally formed with or connected to a strain-sensitive element 2'. Electrical impedance strain-responsive means are connected to this strain-sensitive element, the impedance means being of any desired type such, for example, as electrical resistance wire strain gages 2". A load applied to the loading button strains the sensitive element to cause a proportionate change in impedance such as the electrical resistance of the wire. The impedance changes are measured on any well known indicating apparatus such, for example, as a Wheatstone bridge. To the lower end of shell 1 is screw-threaded an annular plate 3 which is vertically adjustable thereon. Freely coiled about the shell and supported by the annular plate is a compression spring 4 on the upper end of which is a load plate 5 through which the load is initially applied to the spring and upon further increase of load is applied to the combination of spring and strain sensitive element 2'. As will be hereinafter shown, any other equivalent form of elastic structure which deforms under an applied load relative to the strain-sensitive element could with equal effectiveness be substituted for such compression spring. By adjusting annular plate 3 vertically on shell 1, the vertical distance between load plate 5 and loading button 2 can be varied. Such adjustment has the effect of increasing or decreasing the amount of the load required to depress the load plate to the point of contact with the loading button; that is, the greater the distance between the load plate and the loading button, the greater is the load required to establish such contact. The load thus required is herein referred to as the "base weight" or "base load," while compression spring 4 which carries the base load may sometimes herein be referred to as the base load or base weight spring.

As used herein, the expression "base load" is taken to mean that portion of the total load which is to be eliminated from the measurement. The difference between the total load and the base load is herein referred to as the "differential load," the latter being the part of the load it is desired to measure accurately. Thus, my purpose may be to "weigh out" or "weigh in" batches from or to a filled or partially filled tank or bin, in which case I would use as the "base weight" the minimum total weight to be encountered in the course of weighing operation.

In Fig. 1 the full line representation of load plate 3 and the base load spring shows the position of these members when in an unloaded state, while the dotted lines indicate the position of said members under the application of the base weight. With the elastic structure adjusted in such manner to receive a predetermined base weight, any load that is in addition to such base weight will be distributed between the load cell and the elastic structure in direct proportion to their respective stiffnesses. The reading of the load cell thus becomes an index of the load applied after contact is established between the load plate and the loading button. As a practical matter, the compression spring would preferably be so chosen that its axial stiffness would be relatively small compared to that of the load cell. If, for example, such a device is used to weigh a load of 5,000 lbs. which is superimposed upon a base load of 3,000 lbs., the compression spring might be chosen such that it compresses 1" under the base load and annular plate 3 would be adjusted vertically such that the load cell comes into action under a base load somewhat less than 3,000 lbs. Since it is comparatively simple to build a load cell whose strain sensitive element deflects only four or five thousandths of an inch or less under capacity loading, it is clear that the effect of such a spring would be very small, a relationship which is peculiar to the use of a strain-sensitive element in my combination. Because of the smallness of this effect it is easily taken care of in the calibration or it can be corrected by calculation with negligible error even though the spring stiffness is known only approximately. Thus, by the addition of this elastic structure to a load cell, it is possible to employ in said load cell a load sensitive element whose capacity is rated for the differential load which is to be weighed rather than the sum of this load and the base weight. It will be seen that such a device is useful for batch weighing operations where relatively small differential weights are involved. In the event that the entire load to be weighed is within the capacity of the load sensitive element, the compression spring and load plate can be readily removed from the load cell or lowered by screwing plate 3 downward so that spring 4 does not come into action. A variety of springs 4, differing in base load capacity, may be provided to extend the range of usefulness of the device.

As an example of the practical application of such a device, consider the problem of determining the amount of water absorbed by a drying agent such as silica gel in an industrial process where it is necessary to make the determination with considerable accuracy. The weight of the dry silica gel and its container may be perhaps 2,000 lbs., while the maximum weight of the absorbed water would not exceed about 100 lbs. Suppose the base weight spring is made of such stiffness and length that it carries 2,000 lbs. for a deflection of roughly 2 inches and the device is adjusted so that any differential load in excess of 2,000 lbs. is carried jointly by the base weight spring and the strain-sensitive element. Now suppose the rated capacity of the strain-sensitive element is 100 lbs. under which load this element deflects $1/100$ inch. It will be seen that under these assumed conditions the strain-sensitive element will carry 10/11 or about 91% of the differential load so that it is working at high efficiency and thus can respond with excellent sensitivity to the differential load.

The absence of friction in my device will readily be seen to be of great importance to its functioning. Since I use elastic elements for both the base load spring and the differential load-sensing element, it is clear that I have reduced the frictional effects to those due to the internal friction of the metal of which the elastic elements are made. High-grade carbon or alloy steels—or, for the finest results, a material such as "Isoelastic" (a form of elinvar)— show such exceedingly small hysteresis or internal friction effects that I can readily obtain an accuracy in differential weighing, even under field or industrial conditions, that rivals or exceeds the accuracies associated with the highest type of scientific laboratory research. Further, I can do this with loads of such great magnitude that it would be otherwise impossible to obtain accurate differential weighing. It is to be observed that by the use of solely elastic means and means responsive to the strains therein the absence of friction and other errors is achieved with relatively simple and easy construction in contrast to the exceedingly nice workmanship and design which are essential to weighing devices in which mechanical friction or mechanical moving parts enter into the operation.

Another useful application of my invention is to the problem of batch weighing in such operations as the commercial manufacture of ice cream. Here the base weight is large, being made up of the mixing machine and its motor, etc. The ingredients to be "weighed in" are therefore rather small differential weights and the accuracy must be good if quality and economy are to be maintained. At present, the practice is to weigh the ingredients separately and then dump into the mixing machine. This is not only inconvenient but it also presents problems of sanitation. By the use of my differential weighing device the ingredients can be weighed directly as they are fed into the machine from the supply hoppers, thus saving considerable time and assuring perfect sanitation.

Figure 2:
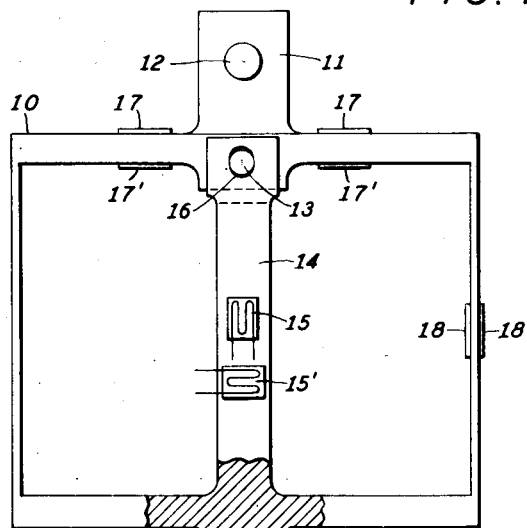
Fig. 2 shows my invention applied to a tension weighing apparatus.

In Fig. 2 I show a modification of my device, which is suitable for use either in tension or compression or both. Instead of compression or base load spring 4 of Fig. 1, I use an elastic frame 10 comprising four flexible sides joined together, preferably in rectangular formation, the upper and lower sides preferably being more substantial than the vertical sides. A simple ring-shaped frame (like a proving ring) is equally effective. Integrally formed with or attached to the upper and lower sides are end pieces 11, each of which is provided with a pin 12 by means of which the total load is carried, whether in compression or tension or other convenient means of attachment may be provided. The upper side of the elastic frame is provided with a transverse pin 13 in vertical alignment with pins 12. Also in alignment with pins 12 and having its lower end secured in any convenient manner to the lower side of the elastic frame is a load sensitive element 14 to which the filaments of electrical strain responsive longitudinal and transverse gages 15 and 15' are bonded. Other electrical strain responsive devices may be employed as well. In the upper free end of load sensitive member 14 and also in line with pins 12 is an elongated or enlarged hole 16 in which transverse pin 13, attached to the upper side of the elastic frame, is vertically movable when a load in tension or compression is applied to the elastic frame through pins 12. Under zero load transverse pin 13 is free of contact with load sensitive element 14, the pin being equidistant from the upper and lower edges of elongated hole 16. When the base load in compression is applied, the downward deflection of elastic frame 10 carries transverse pin 13 downwardly to contact the lower edge of elongated hole 16 and when the base load in tension is applied, the upward deflection of the elastic frame carries transverse pin 13 upwardly to contact the upper edge of elongated hole 13. The clearances provided for vertical movement of pin 13 are chosen to accommodate the desired amount of base load. If desired the clearances may be made adjustable by cams or wedges or screws, etc. Upon the application of any further load, either in compression or tension, the distribution of such additional load between elastic frame 10 and load sensitive member 14 is analogous to that described for Fig. 1, that is, such increase of load will be distributed between these two members in direct proportion to their respective stiffnesses. If desired, forces up to the magnitude of the base weight may be measured by means of strain responsive gages applied at such points as 17, 17' and 18, thus providing a double range weighing device of considerable usefulness.

It may be seen that I can combine the responses of gages 15, 15' and 17, 17' in Fig. 2 electrically by well-known circuit arrangements, one of which is shown in Fig. 8, so that the total load is indicated directly. Thus, as shown in Fig. 8, by switching, or by providing extra strain gages, I can weigh (a) the base load, (b) the differential load in excess of the base load, and (c) the total load on the entire device, being measured directly by gages (a) 17, and 17', (b) 15 and 15', and (c) 17, 17' and 15 and 15' combined, respectively. This is of course true of any other form of my invention as shown, for example, in Fig. 1 where I can place gages 41 and 41' on the spring 4 which perform the same function as gages 17 and 17' in Fig. 2. The circuit shown in Fig. 8 relates to Fig. 2.

Fig. 8 is illustrative of the many circuit arrangements which may be used to accomplish my purpose. Bridge A two arms of which comprise suitable resistors r responds to load in member 14 of Fig. 2; bridge B two arms of which comprise suitable resistors R responds to what I call the "base load." Both bridges are fed from a common A. C. source 48 through transformer 49 which has to secondary windings so that the relationship between the voltages applied to the two bridges is constant so long as rheostats 50 and 51 are left fixed. By adjusting 50 and/or 51 the voltage or current output responses of bridges A and B are adjusted so that indicator 44 responds to the total load acting on the weighing device. Indicating elements 42, 43, and 44 then measure load on member 14, base load, and total load when connected one at a time through switches 45, 46 and 47 respectively. These indicating elements could be simple meters, or they may be meters or recorders driven by appropriate electronic amplifiers. The measurements may also be made by null balancing methods which are too well known and conventional to require detailed description. D. C. operation is equally practical, and the circuit changes necessary will be obvious to those skilled in the art.

Figure 3:
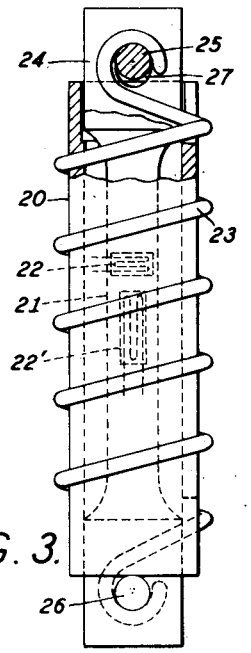
Figs. 3 and 4 show elevational and plan views of my invention employed in a modified tension dynamometer.
Figure 4:
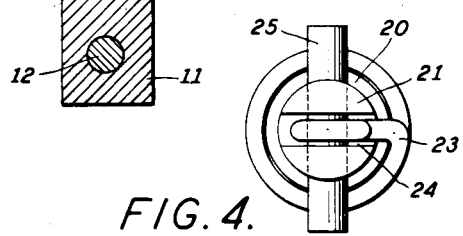

In Figs. 3 and 4, I show the application of the principles of my device to a tension dynamometer. Within a preferably tubular member 20 is positioned a load sensitive member 21, vertically movable therein, to which the filaments of strain responsive gages 22 and 22' are bonded. About the tubular member is a base load extension spring 23 whose upper end is turned inwardly into a slot 24, Fig. 4, located in the upper end of load sensitive member 21, and fastened around an upper transverse pin 25 which under the tensile action of the spring normally rests against the upper end of the tubular member. The lower end of base load spring 23 is likewise turned inwardly into a slot, similar to slot 24, in the lower end of load sensitive member 21, and fastened around a lower transverse pin 26 which normally rests against the lower end of the tubular member under said tensile action of the spring. While lower transverse loading pin 26 is preferably immovably secured to the lower part of load sensitive member 21, upper transverse pin 25 is loosely disposed within an elongated or enlarged hole 27 in the upper end of the load-sensitive member. This elongated hole is so placed with relation to upper transverse pin 25 that until the base load is applied through pin 25 the load-sensitive member is free from all load, the force of base load spring 23 being carried through the tubular member by the engagement therewith of transverse pins 25 and 26; that is, when the dynamometer is unloaded, upper transverse pin 25 is in engagement with the upper end of the tubular member. When a load in tension is applied to transverse pins 25 and 26, pin 25 moves upwardly in elongated hole 27 against the action of the base load spring until it contacts the upper edge of hole 27. Any load in addition to the base load is distributed, as in the case of the foregoing devices, between the base weight spring and the load sensitive member in direct proportion to their respective stiffnesses. The action of this Fig. 3 device differs from those of Figs. 1 and 2 only in that the base load spring is always in a state of stress regardless of whether or not any external load is applied to the structure. Fig. 1 could likewise be modified so that spring 4 is always stressed by means of a member which constrains it from extending but leaves it free to shorten as the base load is applied.

Figure 5:
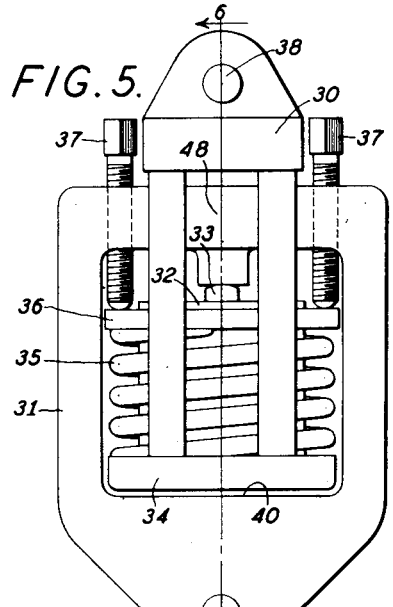
Fig. 5 shows a further modification embodied in a tension type crane scale or similar weighing device.

Fig. 5 shows the application of the principles of my invention to a crane scale or similar weighing device. The device, shown as adapted for loads in tension, consists of an upper assembly or frame 30 and a lower assembly or frame 31, interrelated as schematically shown. A relatively rigid load-sensitive element 32, having a loading button 33, is supported by a plate 34 which forms the bottom of upper frame 30. Surrounding but not touching the load sensitive element and bearing against plate 34 is a base weight spring 35 whose upper end supports an annular member 36. The ends of adjusting screws 37 which are threaded through the upper part of lower frame 31 bear against annular member 36, thus making it possible to impose the desired amount of initial deflection on base weight spring 35. The load is applied at pins 38 and 39 of the upper and lower frames. Fig. 5 shows the structure in fully loaded condition, the tensile force applied at pins 38 and 39 being greater than the base load force. In this condition plate 34 of upper frame 30 clears bearing surface 40 of the lower frame. If the tensile force applied to pins 38 and 39 is less than the base weight force then plate 34 rests against surface 40 of the lower frame and loading button 33 of the load sensitive element loses contact with the lower frame. While it is possible to accomplish the same result by means of a load sensitive element acting in tension and a tension spring, the arrangement of Fig. 5 has many advantages from practical standpoints. For example, it will be seen that it is suitable for crane scales, etc., in which the load sensitive element is relieved of base weight, which makes it possible to utilize the load sensitive element to its highest degree of efficiency. It will be seen further that I have provided convenient means for adjusting the mechanism for various base weights in a simple and convenient manner. Another advantage of this construction is that with a single set of loading members 30 and 31 I can cover a very wide load weighing range by merely inserting suitably selected elements 33 and 35, the selection depending of course upon the magnitude of the differential load to be weighed and base load. Since the tension device shown in Fig. 5 is really a compression arrangement actuated by a pair of yokes 30 and 31, it will readily be seen that the principle is equally well adapted to a compression type weighing device shown in Fig. 7 which has a yoke 45 engaging the underside of a collar 3 while screws 37 apply a differential load to the spring. Other parts of Fig. 7 corresponding to those of Fig. 5 have the same numbers.

In the figures as shown, for example Figs. 1a, 7 etc., the structure or means for applying load to the spring and to the strain sensitive element respectively are the annular area 46 and the central area 47, or the screws 37 and the central button engaging portion 48 of the yokes 31, Fig. 5, and 45, Fig. 7, and similarly for the other figures.

The load responsive element may employ any of the conventional means for sensing the strain or deflection of the element, such as bonded or unbonded wire strain gages, magnetic or variable reluctance devices, capacitative pick-ups, piezoelectric elements, etc. The load responsive element itself may assume a wide variety of forms.

From the disclosure herein it is seen that I have provided a simple, reliable, and efficient elastic means as well as electrical means to be used in conjunction with the load sensitive element of a weighing device whereby the above stated objects are realized.

It will of course be understood by those skilled in the art that various changes may be made in the construction and arrangement of parts without departing from the spirit of the invention as set forth in the appended claims.

I claim:

1. A load weighing device adapted to measure the differential between a total load applied to the device and a predetermined initial part of said total load comprising, in combination, an elastically yieldable helical spring member adapted to support substantially all of any load applied to the device up to said predetermined part load, means for transmitting such applied load to said member, strain sensitive means responsive elastically to loads imposed upon it, said helical spring member being disposed about the strain sensitive means, means for transmitting to said strain sensitive means a portion of the load applied to the device when the total load is in excess of said predetermined part load, both of said load transmitting means being adapted to cause the total load to be carried jointly by said member and said strain sensitive means when said excess load is present, and electrical means responsive to the elastic strain of said strain sensitive means so as to serve as a measure of the magnitude of the differential load.

2. The combination set forth in claim 1 further characterized by the provision of means for varying the magnitude of the predetermined initial part load.

3. The combination set forth in claim 1 further characterized in that both of said load transmitting means have a common load plate for distributing the total load between the elastically yieldable spring member and the strain sensitive means, and a suport for said spring member that is adjustable with respect to the strain sensitive means to vary the distance between the load plate and said strain sensitive member and accordingly determine the magnitude of the predetermined initial part load.

4. The combination described in claim 1 further characterized in that the device is adapted to respond to compression loads and that adjustable means are provided for preloading said load-receiving elastically yieldable member so as to reduce to any desired extent the amount of motion required to bring said strain-sensitive means into operation, said preloading means going out of action when the load applied to the device exceeds the preload set up in said load-receiving elastically yieldable member, and two yokes between which said device is disposed so that a tension load applied to the assembly causes a compresion load of equal magnitude to act upon said device.

5. A load weighing device adapted to measure the differential between a total load applied to the device and a predetermined initial part of said total load comprising, in combination, elastic strain sensitive means responsive to loads imposed upon it, elastic means for initially supporting said predetermined part load while the strain sensitive means remains free of the applied load, means whereby any load in excess of said predetermined initial part of the load is carried jointly by said strain sensitive means and said elastic means, and electrical means responsive to the elastic surface strain of said sensitive means which is responive to loads imposed upon it.

6. A differential tension dynamometer adapted to measure the differential between a total load applied to the dynamometer and a predetermined part load comprising, in combination, a member adapted to carry compression, a strain sensitive tension element disposed within said member, a part load spring, means for supporting said spring entirely by said member when no load is applied to the tension element and while the spring is under a predetermined part load tension, means for transmitting an external load to the spring supporting means, said tension element being substantially free of load until the external load exceeds said part load, means whereby the excess of the external load over the part load is divided between said tension element and said spring in direction proportion to their direct stiffnesses, and means responsive to the strain in said strain sensitive tension element to weigh the excess of the externally applied load over the part load in terms of the load acting on said strain sensitive tension element.

7. The combination set forth in claim 6 further characterized in that the means for dividing the excess load between the tension element and spring includes means whereby the spring supporting means engages the tension element when the external load exceeds said part load thereby to effect said division of the excess load between the tension element and spring.

ARTHUR C. RUGE.

REFERENCES CITED

The following references are of record in the file of this patent:

UNITED STATES PATENTS

| Number | Name | Date |
| --- | --- | --- |
| 1,436,344 | Hickey | Nov. 21, 1922 |
| 2,078,812 | Rudiger | Apr. 27, 1937 |
| 2,421,222 | Schaevitz | May 27, 1947 |
| 2,458,481 | Ruge | Jan. 4, 1949 |
| 2,472,047 | Ruge | May 31, 1949 |

FOREIGN PATENTS

| Number | Country | Date |
| --- | --- | --- |
| 86,750 | Germany | Oct. 1, 1920 |